United States Patent
Deschamplain

(10) Patent No.: US 6,259,177 B1
(45) Date of Patent: Jul. 10, 2001

(54) MOTION IMPARTING SYSTEM

(76) Inventor: David Deschamplain, 921 5th Ave. NW., Largo, FL (US) 33770

( * ) Notice: Subject to any disclaimer, the term of this patent is extended or adjusted under 35 U.S.C. 154(b) by 0 days.

(21) Appl. No.: 09/607,907

(22) Filed: Jun. 30, 2000

(51) Int. Cl.$^7$ .......................... H02K 57/00; F16H 33/20
(52) U.S. Cl. .................. 310/80; 310/20; 74/61; 74/84 R
(58) Field of Search ................ 310/12, 17, 20–21, 310/80, 82, 84; 244/62; 74/55, 572, 61, 84 S, 84 R

(56) References Cited

U.S. PATENT DOCUMENTS

| | | | |
|---|---|---|---|
| 3,653,269 | * | 4/1972 | Foster .................................... 74/84 S |
| 3,968,700 | * | 7/1976 | Cuff ...................................... 74/84 S |
| 3,998,107 | * | 12/1976 | Cuff ...................................... 74/84 S |
| 4,095,460 | * | 6/1978 | Cuff ...................................... 74/84 S |
| 4,238,968 | * | 12/1980 | Cook ..................................... 74/84 R |
| 4,579,011 | * | 4/1986 | Dobos ................................... 74/84 R |
| 5,156,058 | * | 10/1992 | Bristow, Jr. ........................... 74/84 R |
| 5,427,330 | * | 6/1995 | Shimshi ................................. 244/62 |
| 5,969,442 | * | 10/1999 | Mckee et al. ........................... 310/12 |

* cited by examiner

*Primary Examiner*—Tran Nguyen

(57) ABSTRACT

A motion imparting system for converting rotary motion to linear motion comprises a centrifuge. The centrifuge has a chamber. A quantity of fluid fills a portion of the chamber. A motor imparts a rotary motion about a major axis to the centrifuge and moves the water outwardly under the influence of centrifugal forces. An object has its exterior end positioned within the fluid during rotation of the centrifuge and its interior end positioned exterior of the fluid in the air during rotation of the centrifuge. A rod has an axis parallel with but laterally offset from the axis of the centrifuge. A driver rotates the rod at the same speed as the centrifuge. A connector couples the object and the rod whereby when the rod and centrifuge are rotated simultaneously during operation and use, the rotational forces within the system will be converted to a linear force.

5 Claims, 4 Drawing Sheets

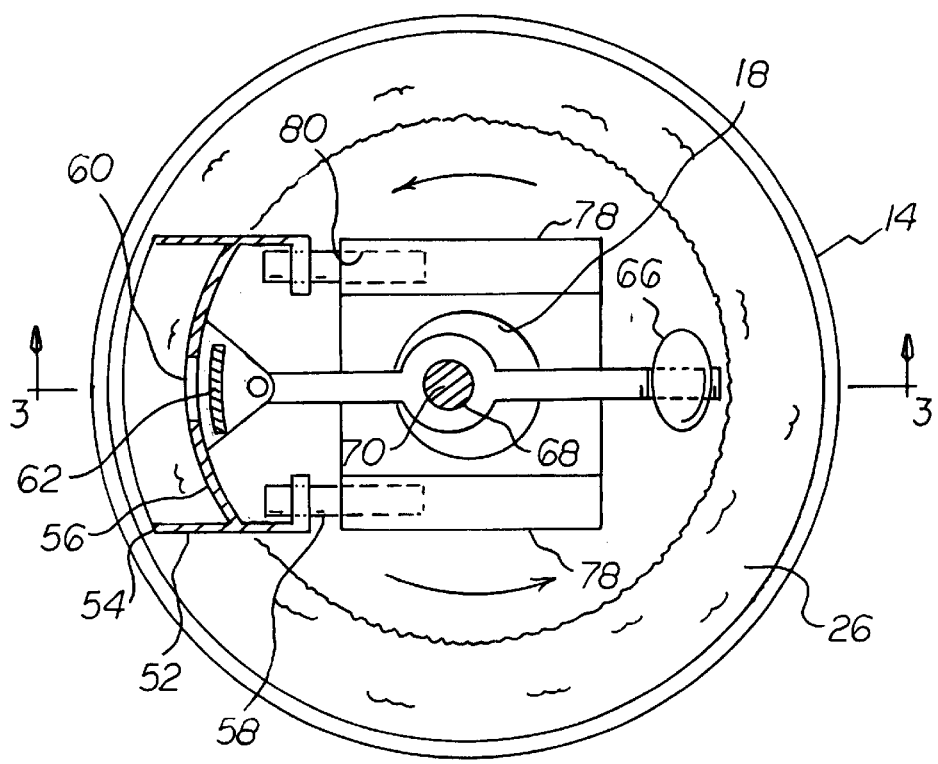
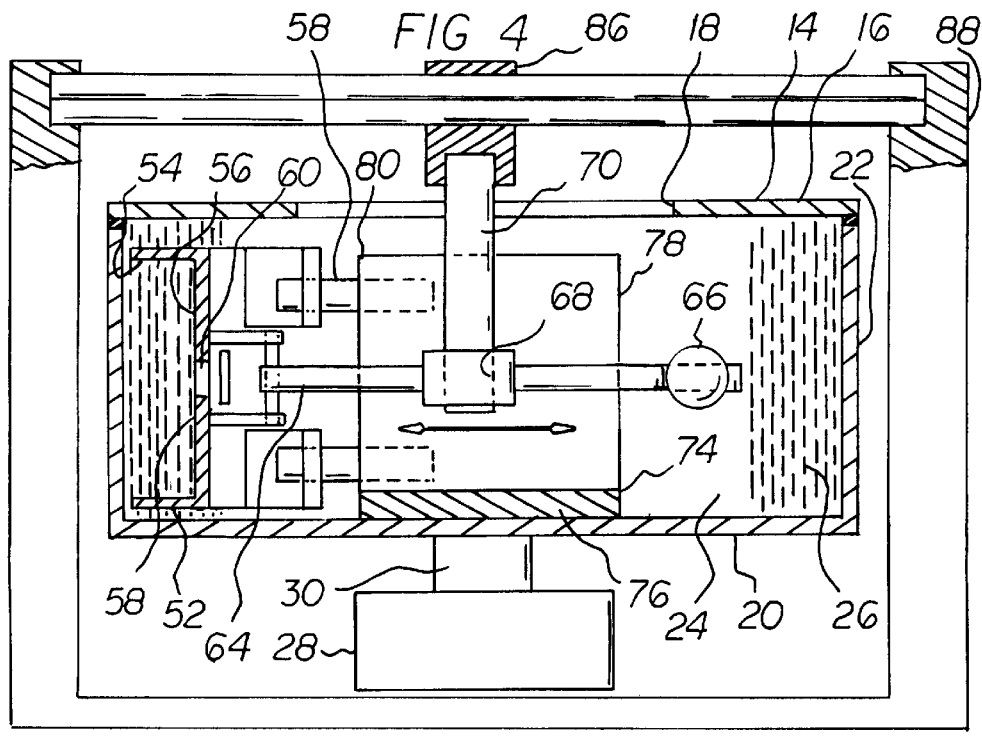

MOTION IMPARTING SYSTEM

BACKGROUND OF THE INVENTION

1. Field of the Invention

The present invention relates to a motion imparting system and more particularly pertains to converting rotary motion to linear motion.

2. Description of the Prior Art

The use of motors and motion imparting systems of known designs and configurations is known in the prior art. More specifically, motors and motion imparting systems of known designs and configurations previously devised and utilized for the purpose of converting one type of motion to another through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,579,011 to Dobos disloses a propulsion apparatus and U.S. Pat. No. 5,969,442 to McKee et al. discloses a reaction propulsion motor and apparatus for using the same.

While these devices fulfill their respective, particular objectives and requirements, the aforementioned patents do not describe a motion imparting system that allows converting rotary motion to linear motion.

In this respect, the motion imparting system according to the present invention substantially departs from the conventional concepts and designs of the prior art, and in doing so provides an apparatus primarily developed for the purpose of converting rotary motion to linear motion.

Therefore, it can be appreciated that there exists a continuing need for a new and improved motion imparting system which can be used for converting rotary motion to linear motion. In this regard, the present invention substantially fulfills this need.

SUMMARY OF THE INVENTION

In view of the foregoing disadvantages inherent in the known types of motors and motion imparting systems of known designs and configurations now present in the prior art, the present invention provides an improved motion imparting system. As such, the general purpose of the present invention, which will be described subsequently in greater detail, is to provide a new and improved motion imparting system and method which has all the advantages of the prior art and none of the disadvantages.

To attain this, the present invention essentially comprises a motion imparting system for converting rotary motion to linear motion. First provided is a centrifuge. The centrifuge has an upper circular end wall. A circular central aperture is provided in the upper circular end wall. The centrifuge also has a lower imperforate circular end wall parallel with the upper circular end wall. The centrifuge also has an imperforate cylindrical sidewall between the upper end wall and lower end wall. The end walls and side wall form a cylindrical chamber within the centrifuge. A quantity of fluid is provided within the chamber and fills a portion of the chamber. The centrifuge further includes a motor. A drive shaft is next provided. The draft shaft couples the center of the lower end wall and the motor to impart a rotary motion about a rotational axis to the centrifuge in a plane extending through the chamber and the drive shaft and the central aperture. The fluid is movable to move toward the sidewall under the influence of centrifugal forces caused by the rotation of the motor and drive shaft and centrifuge with air in the remaining central extent of the chamber. Next provided is a spherical ball. An exterior end of the ball is positioned within the fluid during rotation of the centrifuge and an interior end is positioned exterior of the fluid in the air during rotation of the centrifuge. Next provided is a rod. The rod extends through the central aperture. The lower extent of the rod is within the centrifuge and the upper end is above the centrifuge. The axis of the rod is parallel with but laterally offset from the axis of the centrifuge. A driver is provided to rotate the rod at the same speed as the centrifuge. Lastly, a flexible connector is provided. The connector couples the ball and the rod. Guides are provided. The guides are coupled to the sidewall. In this manner when the rod and centrifuge are rotated simultaneously during operation and use, the ball will continuously move to varying depths within the water to continuously displace a weight of water equal to the buoyancy force of the ball so that when the ball is out of the water to a greater extent then greater forces will be transferred to the rod and when the ball is out of the water to a lesser extent then lesser forces will be transferred to the rod and, as a result, the rotational forces within the system will be converted to a linear force.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motion imparting system which has all of the advantages of the prior art motors and motion imparting systems of known designs and configurations and none of the disadvantages.

It is another object of the present invention to provide a new and improved motion imparting system which may be easily and efficiently manufactured and marketed.

It is further object of the present invention to provide a new and improved motion imparting system which is of durable and reliable constructions.

An even further object of the present invention is to provide a new and improved motion imparting system which is susceptible of a low cost of manufacture with regard to both materials and labor, and which accordingly is then susceptible of low prices of sale to the consuming public, thereby making such motion imparting system economically available to the buying public.

Even still another object of the present invention is to provide a motion imparting system for converting rotary motion to linear motion.

Lastly, it is an object of the present invention to provide a new and improved motion imparting system for converting rotary motion to linear motion comprises a centrifuge. The centrifuge has a chamber. A quantity of fluid fills a portion of the chamber. A motor imparts a rotary motion about a rotational axis to the centrifuge and moves the water outwardly under the influence of centrifugal forces. An object has its exterior end positioned within the fluid during rotation of the centrifuge and its interior end positioned exterior of the fluid in the air during rotation of the centrifuge. A rod has an axis parallel with but laterally offset from the axis of the centrifuge. A driver rotates the rod at the same speed as the centrifuge. A connector couples the object and the rod whereby when the rod and centrifuge are rotated simultaneously during operation and use, the rotational forces within the system will be converted to a linear force.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top elevational view similar to FIGS. 1 and 2 but illustrating an alternate embodiment of the invention.

FIG. 4 is a cross sectional view taken along line 4—4 of FIG. 3.

The same reference numerals refer to the same parts throughout the various Figures.

DESCRIPTION OF THE PREFERRED EMBODIMENT

Figure 1:
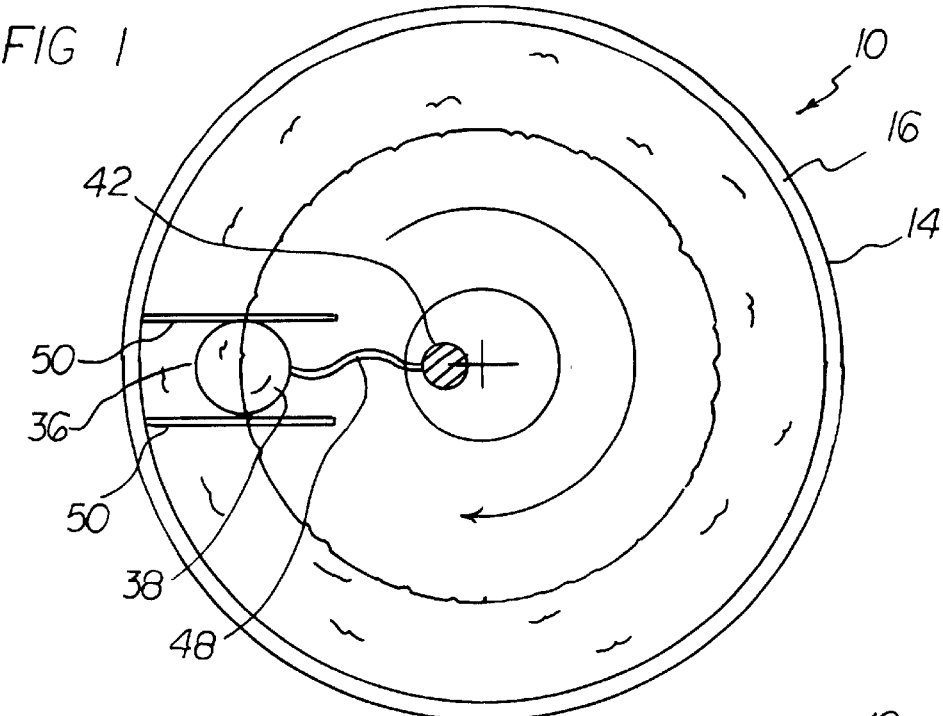
FIG. 1 is an elevational view of the new and improved motion imparting system constructed in accordance with the principles of the present invention.
Figure 2:
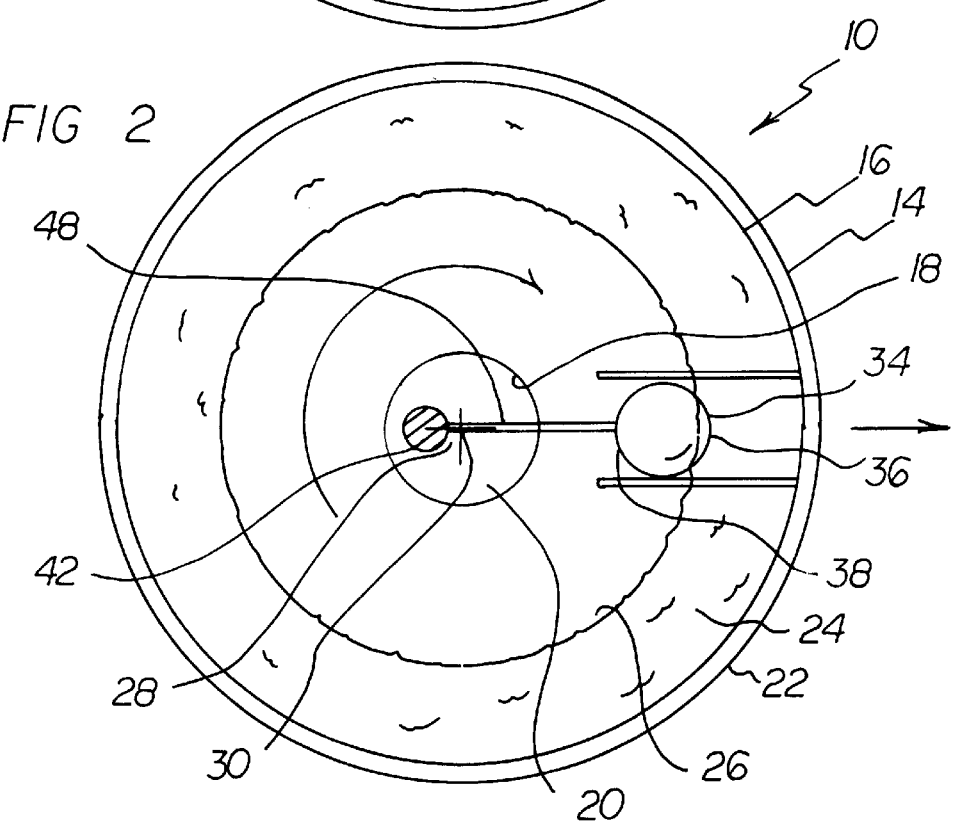
FIG. 2 is a view similar to FIG. 1 but illustrating the spherical ball having been rotated through 180 degrees.
Figure 5:
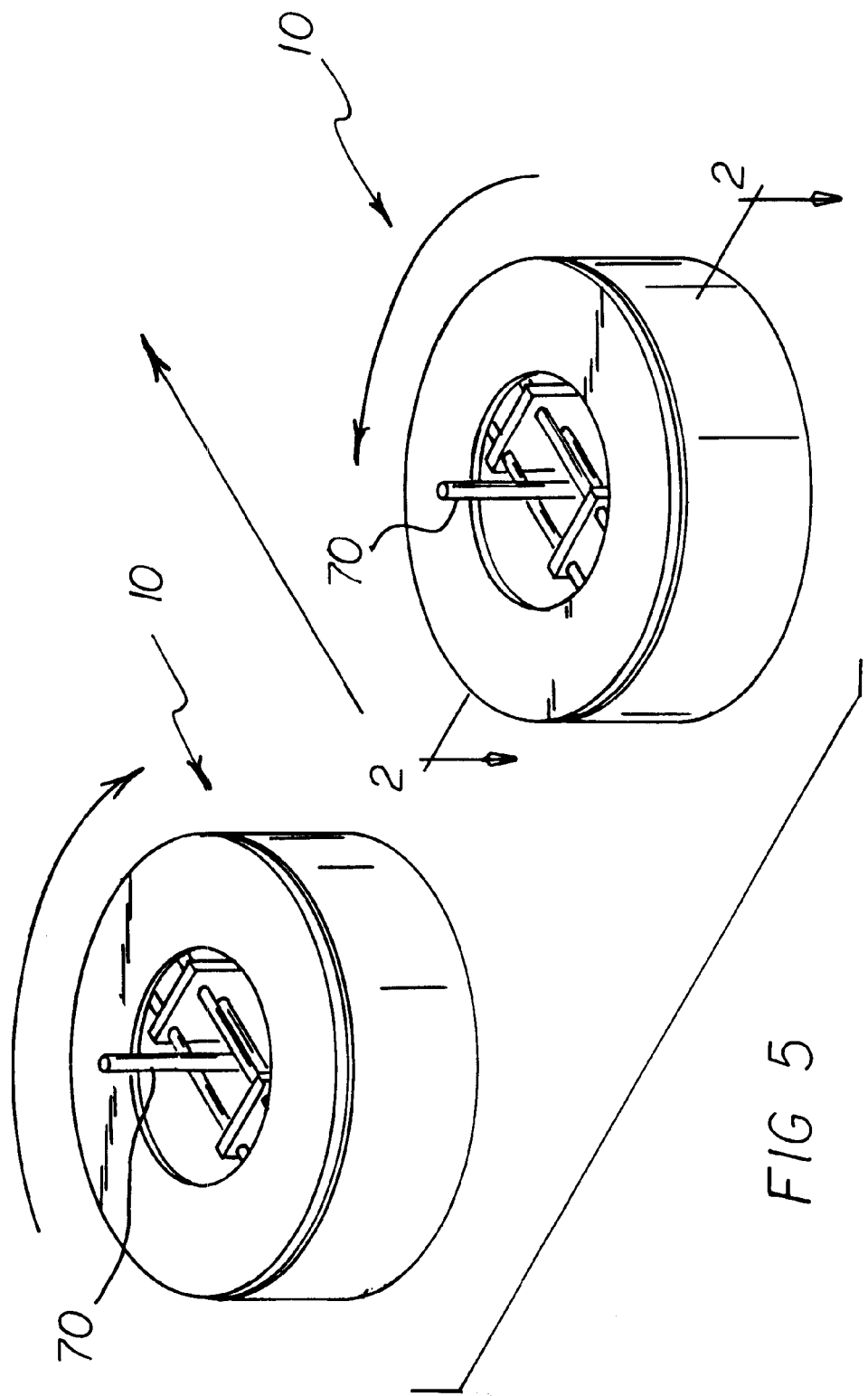
FIG. 5 is a perspective illustration of a pair of systems in side-by-side relationship counter-rotating so as to break the cross torque which might be created by a single system working alone.
Figure 6:
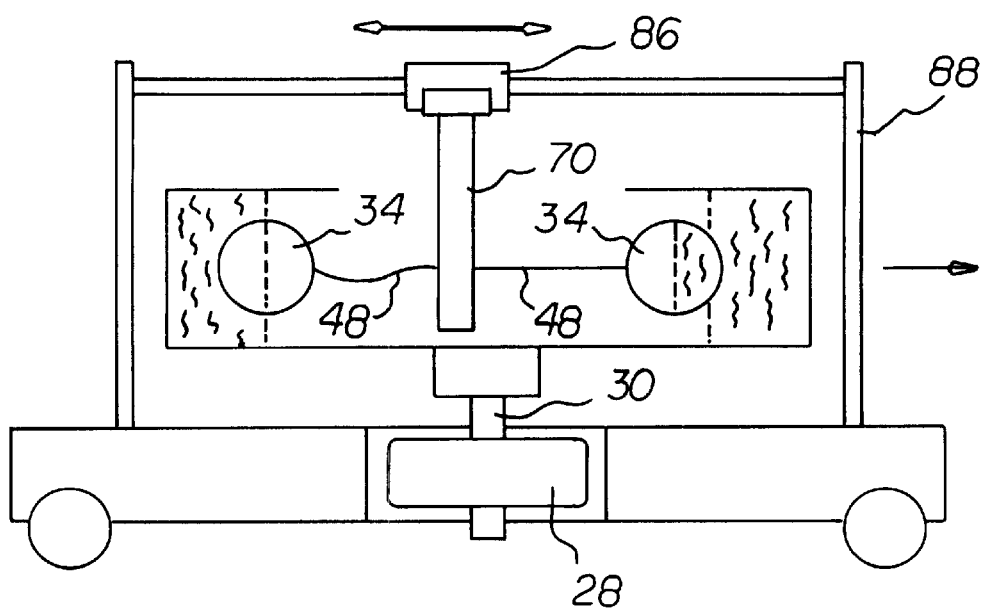
FIG. 6 is a schematic illustration of an embodiment with two balls and wheels, preferably mounted by casters.

With reference now to the drawings, and in particular to FIGS. 1 and 2 thereof, the preferred embodiment of the new and improved motion imparting system embodying the principles and concepts of the present invention and generally designated by the reference numeral 10 will be described.

The present invention, the motion imparting system 10 is comprised of a plurality of components. Such components in their broadest context include a centrifuge, an object, a rod, and a connector. Such components are individually configured and correlated with respect to each other so as to attain the desired objective.

First provided is a centrifuge 14. The centrifuge has an upper circular end wall 16. A circular central aperture 18 is provided in the upper circular end wall. The centrifuge also has a lower imperforate circular end wall 20 parallel with the upper circular end wall. The centrifuge also has an imperforate cylindrical sidewall 22 between the upper end wall and lower end wall. The end walls and side wall form a cylindrical chamber 24 within the centrifuge. A quantity of fluid 26 is provided within the chamber and fills a portion of the chamber. The centrifuge further includes a motor 28. A drive shaft 30 is next provided. The draft shaft couples the center of the lower end wall and the motor to impart a rotary motion about a rotational axis to the centrifuge in a plane extending through the chamber and the drive shaft and the central aperture. The fluid is movable to move toward the sidewall under the influence of centrifugal forces caused by the rotation of the motor and drive shaft and centrifuge with air in the remaining central extent of the chamber.

Next provided is a spherical ball 34. An exterior end 36 of the ball is positioned within the fluid during rotation of the centrifuge and an interior end 38 is positioned exterior of the fluid in the air during rotation of the centrifuge.

Next provided is a rod 42. The rod extends through the central aperture. The lower extent of the rod is within the centrifuge and the upper end is above the centrifuge. The axis of the rod is parallel with but laterally offset from the axis of the centrifuge. The rod rotates at the same speed as the centrifuge. A linear bearing similar to that of the second embodiment and shown in FIG. 4, allows the rod to move to varying distances from the drive shaft.

Lastly, a flexible connector 48 is provided. The connector couples the ball and the rod. Guides 50 are provided. The guides are preferably axially positioned pins coupled to the sidewall to ensure that the ball moves only axially. In this manner when the rod and centrifuge are rotated simultaneously during operation and use, the ball will continuously, move to varying depths within the water to continuously displace a weight of water equal to the buoyancy force of the ball so that when the ball is out of the water to a greater extent then greater forces will be transferred to the rod and when the ball is out of the water to a lesser extent then lesser forces will be transferred to the rod and, as a result, the rotational forces within the system will be converted to a linear force. Plural balls connected to the rod by plural connectors, preferably symmetrically located around the rod, may be utilized.

In an alternate embodiment of the invention, as shown in FIGS. 3 and 4, first provided is a centrifuge 14. The centrifuge has an upper circular end wall 16. A circular central aperture 18 is provided in the upper circular end wall. The centrifuge also has a lower imperforate circular end wall 20 parallel with the upper circular end wall. The centrifuge also has an imperforate cylindrical sidewall 22 between the upper end wall and lower end wall. The end walls and side wall form a cylindrical chamber 24 within the centrifuge. A quantity of fluid 26 is provided within the chamber and fills a portion of the chamber. The centrifuge further includes a motor 28. A drive shaft 30 is next provided. The draft shaft couples the center of the lower end wall and the motor to impart a rotary motion about a rotational axis to the centrifuge in a plane extending through the chamber and the drive shaft and the central aperture. The fluid is movable to move toward the sidewall under the influence of centrifugal forces caused by the rotation of the motor and drive shaft and centrifuge with air in the remaining central extent of the chamber. These components are essentially the same as in the first embodiment.

In this alternate embodiment, a bucket 52 is next provided. The bucket is formed of a cylindrical sidewall with an open exterior end 54 and a curved interior end 56 formed with an end wall 58. A port 60 is provided through the end wall. The exterior end of the bucket is located in the water with the interior end of the bucket located in the air during operation and use. The bucket also has four posts 58. The interior ends of the posts are coupled to the end wall of the bucket on the side opposite from the sidewall of the bucket. The posts are in parallel relationship with each other and parallel with an axis transverse to the rotational axis of the centrifuge.

Next provided in the alternate embodiment is an imperforate closure plate 62. The plate is within the bucket adjacent to the ports of the end wall of the bucket. The closure plate has a rod 64 coupled to its center and extending to adjacent to the center of the end wall of the bucket for reciprocating the closure plate between an exterior position away from the ports and a retracted position adjacent the ports for thereby creating a vacuum within the interior region of the bucket whereby water there adjacent will be pulled from the sidewall of the centrifuge during operation and use. A counterweight 66 is provided at the end of the rod remote from the bucket. A cylindrical bore 68 extends through the rod intermediate its ends. A drive rod 70 is rotatably received within the bore. The drive rod has an axis parallel with it offset from the rotational axis of the centrifuge and its drive shaft.

Additionally, in the alternate embodiment, a U-shaped guide assembly 74 is provided. The guide assembly has a central section 76 coupled to the lower end wall of the centrifuge for rotation therewith. Parallel upstanding sections 78 are provided. The parallel upstanding sections are each in a rectangular configuration. A plurality of corner bearing holes 80 are provided through the upstanding sections adjacent to the corners for reciprocatingly receiving the posts of the bucket. Activation of the motor will rotate the drive shaft, centrifuge, guide assembly and bucket in a continuing 360 degree rotation with the closure plate, such as an electromagnetic door, reciprocating between and open orientation and a closed orientation at about 180 degrees spaced, locations, more or less, through the action of the cylindrical bore and the rod to thereby allow all of the water to be adjacent to the side wall when in the gear orientation and to allow some of the water to move away from the side wall by suction, when in the closed orientation for generating a linear motion is one direction within the plane of the centrifuge.

Lastly, as in the first embodiment, a linear bearing 86 is provided to support the upper end of the drive rod 70. The linear bearing is supported at its ends by a bridge 88 coupled to the centrifuge for concurrent rotation. The linear bearing allows the drive rod to move closer to the drive shaft 30 for minimum force or farther therefrom for maximum force while maintaining parallelism.

The present invention functions to attain linear motion from centrifugal force and centripetal force using a centrifuge with a fluid, such as water, and a floating ball half filled with a fluid such as water. The preferred embodiment consists of a main frame assembly which may have four wheels that swivel in any direction, a centrifuge, an electric motor that turns the centrifuge, and a bridge over the top of the centrifuge with an axle connected to a linear bearing which is connected to the bridge that is connected to the main frame assembly. The centrifuge is spun until the water is against the inside wall of the centrifuge. The wall of water is symmetrical all the way around the inside of the centrifuge. A ball, half filled with water, is then placed into the water in the centrifuge. When the ball is halfway in, buoyancy will allow the ball to float. The ball stays in one position of the 360 degrees. There is a marked position on the outer end of the centrifuge. When the marked spot moves 360 degrees, the ball moves with the mark and the water in the centrifuge 360 degrees. The ball can go up and down in the water but not left or right of the mark on the centrifuge. The ball can move from its buoyancy level to a lower orbit towards the center of the centrifuge. A flexible connector is between the ball and an independent axle that rides on a linear bearing connected to a rail or bridge over the top of the centrifuge, which is connected to the main frame assembly that holds the centrifuge and motor. When the rail axle is offset just a small amount from the center of the centrifuge axle in any one direction, the weight of the ball is transferred to the rail axle. The axle rids on a linear bearing so it can be offset from the centrifuge axle. The axle is offset and acts like a cam. The surface of the water in the ball moves above the surface of the water in the centrifuge. In this manner, the weight above the water surface of the centrifuge which is the weight of water in the ball above the surface of the water in the centrifuge is transferred from the centrifuge water to the rail axle which holds the ball. The ball lifts from the water for 180 degrees of the turn and pulls the centrifuge in a forward motion and gently returns the ball to its buoyancy level on the last 180 degrees of turn. The water in the centrifuge is always balanced while the ball is in the water or out of the water. Displacement of water where the ball floats is the same weight as the ball in the water. The ball is out of balance in the first 180 degrees and then balanced in the second 180 degrees while the water in the centrifuge is always balanced. Another way this can be done is the straw effect. Note FIGS. 3 and 4. If you place a straw in a glass of water and place your thumb over the top of the straw opening and pick the straw up a little, the surface of the water in the straw will come up above the water surface in the glass thereby using the water in the glass as a weight. Letting your thumb off the straw allows the water to drain back into the glass. This procedure is basically the same as the ball that is half full of water and the other half is air. The ball has buoyancy because of the air which holds the water in the ball up. As such, the straw has air between the thumb on the straw and the surface of the water in the straw thereby holding the weight of water in the straw. This claim uses both sequences. Both embodiments are basically using this method.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A motion imparting system for converting rotary motion to linear motion comprising, in combination:

a centrifuge having an upper circular end wall with a circular central aperture and a lower imperforate circular end wall parallel therewith and with an imperforate cylindrical sidewall there between, the end walls and side wall forming a cylindrical chamber within the centrifuge and with a quantity of fluid filling a portion of the chamber, the centrifuge further including a motor and a drive shaft coupling the center of the lower end wall and the motor to impart a rotary motion about a rotational axis to the centrifuge in a plane extending through the chamber and the drive shaft and the central aperture, the fluid movable toward the sidewall under the influence of centrifugal forces caused by the rotation of the motor and drive shaft and centrifuge with air in the the chamber remote from the fluid;

a spherical ball with an exterior end positioned within the fluid during rotation of the centrifuge and an interior end positioned exterior of the fluid in the air during rotation of the centrifuge;

a rod extending through the central aperture with a lower extent within the centrifuge and an upper end above the centrifuge and with an axis parallel with but laterally offset from the axis of the centrifuge with a driver to rotate the rod at the same speed as the centrifuge; and a flexible connector coupling the ball and the rod with guides coupled to the sidewall whereby when the rod and centrifuge are rotated simultaneously during operation and use, the ball will continuously move to varying depths within the fluid to continuously displace a weight of fluid equal to the buoyancy force of the ball so that when the ball is out of the fluid to an increased extent then increased forces will be transferred to the rod and when the ball is out of the fluid to a decreased extent then decreased forces will be transferred to the rod and, as a result, the rotational forces within the system will be converted to a linear force.

2. A motion imparting system for converting rotary motion to linear motion comprising, in combination:

a centrifuge having an upper circular end wall with a circular central aperture and a lower imperforate circular end wall parallel therewith and with an imperforate cylindrical sidewall there between, the end walls and side wall forming a cylindrical chamber within the centrifuge and with a quantity of fluid filling a portion of the chamber, the centrifuge further including a motor and a drive shaft coupling the center of the lower end wall and the motor to impart a rotary motion to the centrifuge in a plane about a rotational axis extending through the chamber and the drive shaft and the central aperture, the fluid movable toward the sidewall under the influence of centrifugal forces upon rotation of the motor and drive shaft and centrifuge with air in the chamber remote from the fluid;

a bucket formed of a cylindrical sidewall with an open exterior end and a curved interior end formed with end wall having ports there through, the exterior end of the bucket being located in the fluid with the interior end of the bucket being located in the air during operation and use, the bucket also having four posts with interior ends coupled to the end wall of the bucket on the side thereof opposite from the sidewall of the bucket, the posts being in parallel relationship with each other and parallel with an axis transverse to the rotational axis of the centrifuge;

an imperforate closure plate adjacent to the bucket adjacent to the ports of the end wall of the bucket, the closure plate having a rod coupled to its center and extending to adjacent to the center of the end wall of the bucket for reciprocating the closure plate between an exterior position away from the ports and a retracted position adjacent the ports for thereby creating a vacuum within the interior region of the bucket whereby fluid there adjacent will be pulled from the sidewall of the centrifuge during operation and use, the rod having a counterweight at the end thereof remote from the bucket with a cylindrical bore extending through the rod intermediate its ends and with a drive rod rotatably received within the bore, the drive rod having an axis parallel with it offset from the rotational axis of the centrifuge and its drive shaft; and a U-shaped guide assembly having a central section coupled to the lower end wall of the centrifuge for rotation therewith and with parallel upstanding sections, the parallel upstanding sections each being in a rectangular configuration with four corner bearing holes there through adjacent to the corners for reciprocatingly receiving the posts of the bucket, the rod having a central bearing hole for reciprocatingly receiving the rod of the closure plate whereby activation of the motor will rotate the drive shaft, centrifuge, guide assembly, bucket and closure plate in a continuing 360 degree rotation with the closure plate reciprocating between and open orientation and a closed orientation at 180 degrees spaced, locations through the action of the cylindrical bore and the rod to thereby allow all of the fluid to be adjacent to the side wall when in the gear orientation and to allow some of the fluid to move away from the side wall by suction, when in the closed orientation for generating a linear motion is one direction within the plane of the centrifuge.

3. A motion imparting system for converting rotary motion to linear motion comprising:

a centrifuge having a chamber and with a quantity of fluid filling a portion of the chamber and a motor to impart a rotary motion about a rotational axis to the centrifuge and move the fluid outwardly under the influence of centrifugal forces, an object with an exterior end positioned within the fluid during rotation of the centrifuge and an interior end positioned exterior of the fluid in the air during rotation of the centrifuge;

a rod with an axis parallel with but laterally offset from the axis of the centrifuge with a driver to rotate the rod at the same speed as the centrifuge; and a connector coupling the object and the rod whereby when the rod and centrifuge are rotated simultaneously during operation and use, the rotational forces within the system will be converted to a linear force.

4. The system as set forth in claim 2 wherein the spherical object is a spherical ball with an exterior end positioned within the fluid during rotation of the centrifuge and an interior end positioned exterior of the fluid in the air during rotation of the centrifuge and further including a flexible connector coupling the ball and the rod with guides coupled to the sidewall whereby when the rod and centrifuge are rotated simultaneously during operation and use, the ball will continuously move to varying depths within the fluid to continuously displace a weight of fluid equal to the buoyancy force of the ball so that when the ball is out of the fluid to an increased extent then increased forces will be transferred to the rod and when the ball is out of the fluid to a decreased extent then decreased forces will be transferred to the rod and, as a result, the rotational forces within the system will be converted to a linear force.

5. The system as set forth in claim 3 wherein the object is a bucket formed of a cylindrical sidewall with an open exterior end and a curved interior end formed with end wall having ports there through, the exterior end of the bucket being located in the fluid with the interior end of the bucket being located in the air during operation and use, the bucket also having four posts with interior ends coupled to the end wall of the bucket on the side thereof opposite from the sidewall of the bucket, the posts being in parallel relationship with each other and parallel with an axis transverse to the rotational axis of the centrifuge;

an imperforate closure plate adjacent to the bucket adjacent to the ports of the end wall of the bucket, the closure plate having a rod coupled to its center and extending to adjacent to the center of the end wall of the bucket for reciprocating the closure plate between an exterior position away from the ports and a retracted position adjacent the ports for thereby creating a vacuum within the interior region of the bucket whereby fluid there adjacent will be pulled from the sidewall of the centrifuge during operation and use, the rod having a counterweight at the end thereof remote from the bucket with a cylindrical bore extending through the rod intermediate its ends and with a drive rod rotatably received within the bore, the drive rod having an axis parallel with it offset from the rotational axis of the centrifuge and its drive shaft; and a U-shaped guide assembly having a central section coupled to the lower end wall of the centrifuge for rotation therewith and with parallel upstanding sections, the parallel upstanding sections each being in a rectangular configuration with four corner bearing holes there through adjacent to the corners for reciprocatingly receiving the posts of the bucket, the rod having a central bearing hole for reciprocatingly receiving the rod of the closure plate whereby activation of the motor will rotate the drive shaft, centrifuge, guide assembly, bucket and closure plate in a continuing 360 degree rotation with the closure plate reciprocating between and open orientation and a closed orientation at 180 degrees spaced, locations through the action of the cylindrical bore and the rod to thereby allow all of the fluid to be adjacent to the side wall when in the gear orientation and to allow some of the fluid to move away from the side wall by suction, when in the closed orientation for generating a linear motion is one direction within the plane of the centrifuge.

* * * * *